United States Patent [19]

Sugiyama et al.

[11] 4,447,138

[45] May 8, 1984

[54] OBJECTIVE SYSTEM FOR VIDEO DISC

[75] Inventors: Takahiro Sugiyama; Yukio Hagiwara, both of Tokyo, Japan

[73] Assignee: Asahi Kogaku Kogyo Kabushiki Kaisha, Tokyo, Japan

[21] Appl. No.: 357,341

[22] Filed: Mar. 11, 1982

[30] Foreign Application Priority Data

Mar. 12, 1981 [JP] Japan ................................ 56-35719

[51] Int. Cl.³ ............................................... G02B 9/34
[52] U.S. Cl. ...................................... 350/472; 350/414
[58] Field of Search ................................ 350/472, 414

[56] References Cited

U.S. PATENT DOCUMENTS 4,258,981  3/1981  Goto .................................... 350/414

Primary Examiner—John K. Corbin
Assistant Examiner—Rebecca D. Gass
Attorney, Agent, or Firm—Sughrue, Mion, Zinn, Macpeak and Seas

[57] ABSTRACT

An objective system for a video disc comprising four lenses grouped into four lens components. The first lens component is a positive meniscus lens, the second lens component is a positive meniscus lens, the third lens component is a positive meniscus lens having a relatively long focal length or a negative meniscus lens, and the fourth lens component is a positive meniscus lens. The objective system satisfies the following conditions:

(1) $1.7F > F_{1,2} > 1.4F$
(2) $1.35 > F_1/F_2 > 0.75$
(3) $1.0 > F_{1,2}/F_{1,2,3} > 0.8$
(4) $1.1F > d_5 > 0.4F$
(5) $d_6 > 0.5F$
(6) $N_4 > 1.7$ where F is the resultant focal length of the objective lens assembly, $F_1$ is the focal length of the first lens component, $F_2$ is the focal length of the second lens component, $F_{1,2}$ is the resultant focal length of the first and second lens components, $F_{1,2,3}$ is the resultant focal length of the first, second and third lens components, $r_i$ is the radius of curvature of the i-th surface, $d_i$ is the lens thickness or air gap of the i-th lens surface and the adjacent lens surface, and $N_i$ is the refractive index of the i-th lens.

4 Claims, 4 Drawing Figures

--- MERIDIONAL
— SAGITTAL

COMA ABERRATION

WAVE FRONT ABERRATION

OBJECTIVE SYSTEM FOR VIDEO DISC

BACKGROUND OF THE INVENTION

This invention relates to an objective for a video disc for high-density information recording disc, and more particularly to an objective which is used for a video disc using a semiconductor laser as a light source.

A video disc using a semiconductor laser as a light source is well known in the art. In this system, a laser beam from the semiconductor laser is focused on the mirror surface of the disc by an objective, and the laser beam reflected by the mirror surface of the disc is returned through the objective to the semiconductor laser, more specifically to the laser beam generating point, so that the information on the disc is detected according to the intensity of the laser beam thus returned. In this operation, in order that the tracking and the focusing are carried out satisfactorily, the semiconductor laser is moved together with the objective. Accordingly, the movable objective must be small in size and light in weight. Furthermore, since it is required for the objective to read the information which is recorded on the disc with high density, the objective lens should have a resolution power of at least one micron, and accordingly the objective should be sufficiently large in diameter, or it should have a numerical aperture (N.A.) of about 0.5.

This invention has developed an objective system small in size and weight for a video disc, which satisfies specific conditions and has a sufficiently long operating distance or backfocus and in which various abberations are satisfactorily corrected.

SUMMARY OF THE INVENTION

The present invention provides as an object an objective system comprising four lens components, the first lens component including a positive meniscus lens, the second lens component including a positive meniscus lens, the third lens component including a positive meniscus lens having a relatively long focal length or a negative meniscus lens, and the fourth lens component including a positive meniscus lens. The objective system satisfies the following conditions:

(1) $1.7F > F_{1,2} > 1.4F$
(2) $1.35 > F_1/F_2 > 0.75$
(3) $1.0 > F_{1,2}/F_{1,2,3} > 0.8$
(4) $1.1F > d_5 > 0.4F$
(5) $d_6 < 0.5F$
(6) $N_4 > 1.7$ where F is the resultant focal length of the objective system, $F_1$ is the focal length of the first lens component, $F_2$ is the focal length of the second lens component, $F_{1,2}$ is the resultant focal length of the first and second lens components, $F_{1,2,3}$ is the resultant focal length of the first, second and third lens components, $r_i$ is the radius of curvature of the i-th surface, $d_i$ is the lens thickness or air gap of the i-th surface to the adjacent lens surface, and $N_i$ is the refractive index of the i-th lens.

DETAILED DESCRIPTION OF THE INVENTION

Figure 1:
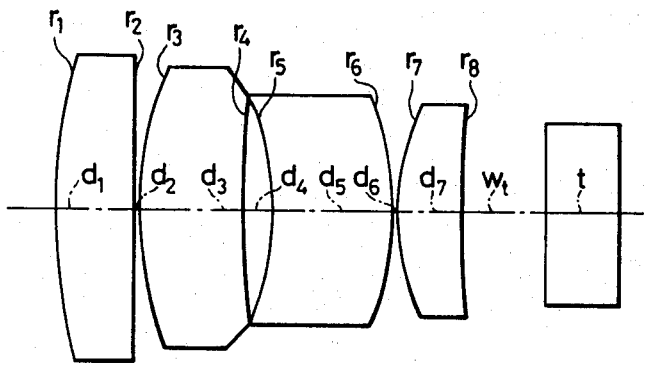
FIG. 1 is an explanatory diagram showing the arrangement of lenses in the Example 1 of an objective system according to the invention.
Figure 2:
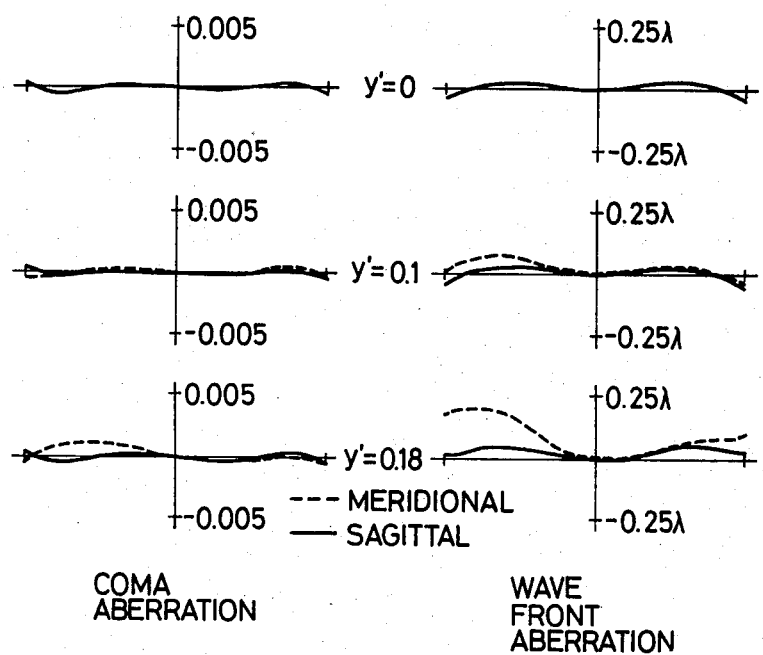
FIG. 2 is a graphical representation indicating the coma aberrations and wave front aberrations of the objective system in FIG. 1.
Figure 3:
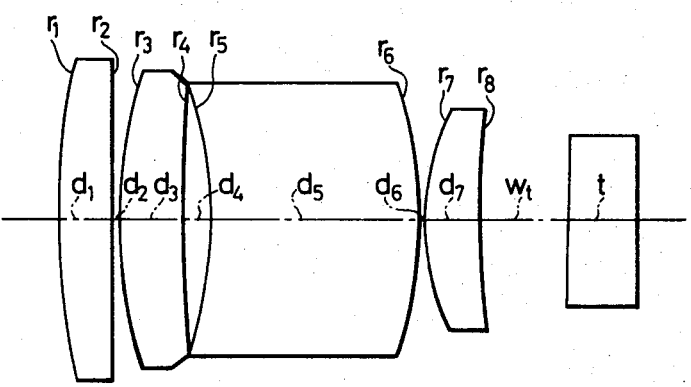
FIG. 3 is an explanatory diagram showing the arrangement of lenses in the Example 2 of the objective system according to the invention.
Figure 4:
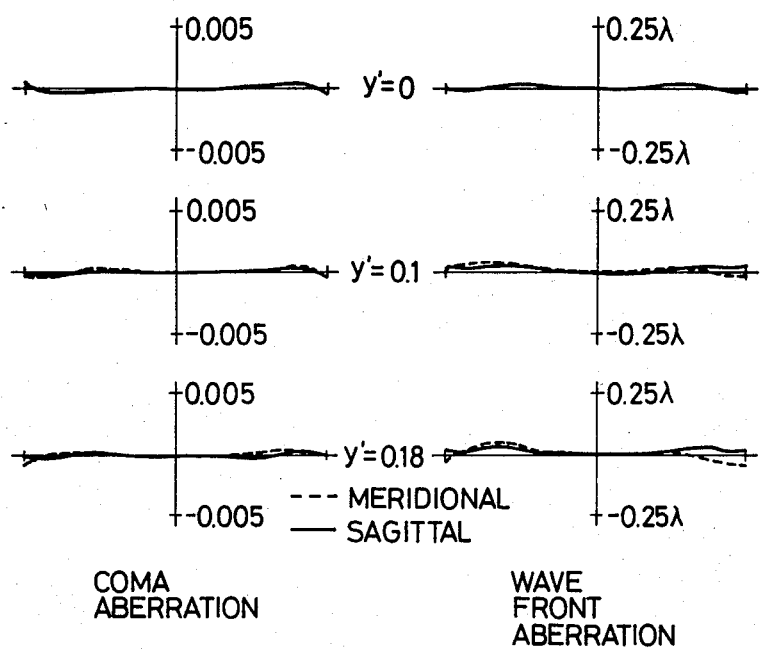
FIG. 4 is a graphical representation indicating the coma aberrations and wave front aberrations of the objective system in FIG. 3

The aforementioned conditions will be described. The condition (1), $1.7F > F_{1,2} > 1.4F$, is to minimize the spherical aberration. When $F_{1,2}$ is greater than the upper limit 1.7F, the amount of spherical aberration with the first and second lens components is excessively large, and accordingly the spherical aberration must be greatly corrected with the third lens component or the fourth lens component. As a result, the absolute value of the spherical aberration is unavoidably large. When $F_{1,2}$ is smaller than the lower limit 1.4F, the spherical aberration with the first and second lens component can be made small; however, in order to obtain the aimed focal distance it is necessary to reduce the focal length of the third and fourth lens components. In this case, the amount of spherical aberration becomes large, and accordingly it is impossible to obtain the aimed spherical aberration.

The conditions (2) and (3) are also required to correct the spherical aberration. In order to minimize the absolute value of the spherical aberration, it is desirable to minimize the amount of spherical aberration and correction therefor of each lens. The condition (2), $1.35 > F_1/F_2 > 0.75$, is to make the amounts of spherical aberration of the first and second lens components equal as much as possible. When $F_1/F_2$ is larger than the upper limit 1.35 or smaller than the lower limit 0.75, it is difficult to correct the spherical aberration to the aimed value. The third lens component, providing a positive spherical aberration, is essential to correct the spherical aberration. The function of the third lens component to correct the spherical aberration is clearly defined by the condition (3), $1.0 > F_{1,2}/F_{1,2,3} > 0.8$ The third lens component, providing the positive spherical aberration, is important to correct the spherical aberration. When $F_{1,2}/F_{1,2,3}$ is larger than the upper limit 1.0, the amount of positive spherical aberration provided is small, and therefore it is difficult to correct the spherical aberration. When $F_{1,2}/F_{1,2,3}$ is smaller than the lower limit 0.8, amount of spherical aberration correction becomes excessively large, and therefore, the absolute value of the spherical aberration becomes large.

The conditions (4) and (5) are established to increase the backfocus or the operating distance. When, in the condition (4), $1.1F > d_5 > 0.4F$, $d_5$ is smaller than 0.4F, it is difficult to obtain the aimed backfocus. When $d_5$ is larger than 1.1F, advantageously the aimed backfocus may be obtained; however, the weight of the lens is increased, and accordingly it is impossible to form an aimed objective which is small and light. When, in the condition (5), $d_6 < 0.5F$, $d_6$ is greater than 0.5F, then it is impossible to obtained the aimed backfocus, and the total length of the lens system is increased. Therefore, in this case also, it is impossible to form the aimed objective small in both size and weight.

The condition (6), $N_4 > 1.7$, is to correct the spherical aberration. As the focal length of the fourth lens group is determined necessarily from the conditions (1), (2) and (3), the amount of spherical aberration of the fourth lens component becomes large. This is prevented by the condition (6). When $N_4$ is smaller than 1.7, the amount of spherical aberration becomes large, and therefore the amount of spherical aberration correction with the third lens component becomes excessively large. As a result, the absolute value of the spherical aberration becomes large. The condition (6) is for the fourth lens component. In order to reduce the spherical aberration, in general, it is preferable to use optical glass material high in refractive index to form all the lenses. However, the glass material high in refractive index is generally large in specific weight and expensive. Therefore, according to the use of a lens to be developed, suitable glass material should be selected.

The objective for a video disc according to the invention is one which satisfies the above-described conditions (1) through (6) and in which the various aberrations, especially the spherical aberration, are satisfactorily corrected.

The numerical data of Examples 1 and 2 of the objective according to the invention are as listed below. In the Examples 1 and 2, t is the thickness of a cover glass, Nt is the refractive index of the cover glass, Wt is the aerial space or the operating distance between the objective and the cover glass, and all the refractive indexes are those with respect to a ray of light having a wavelength of 780 nm.

EXAMPLE 1

| | | | |
|---|---|---|---|
| $L_1$ | $r_1 = 10.060$ | $d_1 = 1.30$ | $N_1 = 1.74411$ |
| | $r_2 = 110.131$ | $d_2 = 0.10$ | |
| $L_2$ | $r_3 = 6.331$ | $d_3 = 1.70$ | $N_2 = 1.74411$ |
| | $r_4 = 16.520$ | $d_4 = 0.51$ | |
| $L_3$ | $r_5 = -4.726$ | $d_5 = 2.00$ | $N_3 = 1.74411$ |
| | $r_6 = -5.197$ | $d_6 = 0.10$ | |
| $L_4$ | $r_7 = 4.352$ | $d_7 = 1.10$ | $N_4 = 1.74411$ |
| | $r_8 = 24.402$ | | |
| | $F = 4.5$ | N.A. $= 0.5$ | |
| | $Wt = 1.40$ | $t = 1.20$ | $Nt = 1.49$ |
| | $F_{1,2} = 6.97$ | | |
| | $F_1/F_2 = 14.80/12.88 = 1.15$ | | |
| | $F_{1,2}/F_{1,2,3} = 6.97/7.82 = 0.89$ | | |

EXAMPLE 2

| | | | |
|---|---|---|---|
| $L_1$ | $r_1 = 11.188$ | $d_1 = 0.92$ | $N_1 = 1.74411$ |
| | $r_2 = 206.715$ | $d_2 = 0.10$ | |
| $L_2$ | $r_3 = 7.056$ | $d_3 = 1.03$ | $N_2 = 1.74411$ |
| | $r_4 = 20.253$ | $d_4 = 0.48$ | |
| $L_3$ | $r_5 = -6.667$ | $d_5 = 3.46$ | $N_3 = 1.48260$ |
| | $r_6 = -6.515$ | $d_6 = 0.10$ | |
| $L_4$ | $r_7 = 4.161$ | $d_7 = 0.91$ | $N_4 = 1.86890$ |
| | $r_8 = 16.000$ | | |
| | $F = 4.5$ | N.A. $= 0.5$ | |
| | $Wt = 1.40$ | $t = 1.20$ | $Nt = 1.49$ |
| | $F_{1,2} = 7.55$ | | |
| | $F_1/F_2 = 15.88/14.08 = 1.12$ | | |
| | $F_{1,2}/F_{1,2,3} = 7.55/8.27 = 0.91$ | | |

What is claimed is:

1. An objective system for a video disc, said objective system including a plurality of lenses each having lens surfaces with at least some of said lens surfaces being separated by air gaps, said objective system including, in order from the object side, a first lens component including a positive meniscus lens $L_1$, a second lens component including a positive meniscus lens $L_2$, a third lens component including a negative meniscus lens $L_3$, a fourth lens component including a positive meniscus lens $L_4$, and a cover glass for said video disc, said objective system satisfying the following conditions:

(1) $1.7F > F_{1,2} > 1.4F$
   (2) $1.35 > F_1/F_2 > 0.75$
   (3) $1.0 > F_{1,2}/F_{1,2,3} > 0.8$
   (4) $1.1F > d_5 > 0.4F$
   (5) $d_6 < 0.5F$
   (6) $N_4 > 1.7$, where F is the composite focal length of the objective system, $F_1$ is the focal length of said first lens component, $F_2$ is the focal length of said second lens component, $F_{1,2}$ is the composite focal length of said first and second lens components, $F_{1,2,3}$ is the composite focal length of said first, second, and third lens components, $d_i$ is the distance from the i-th lens surface to the (i+1)-th lens surface in order from said object side, and $N_i$ is the refractive index of the i-th lens numbered from said object side.

2. An objective system for a video disc as claimed in claim 1, said objective system being further defined as follows:

| | | | |
|---|---|---|---|
| $L_1$ | $r_1 = 10.060$ | $d_1 = 1.30$ | $N_1 = 1.74411$ |
| | $r_2 = 110.131$ | $d_2 = 0.10$ | |
| $L_2$ | $r_3 = 6.331$ | $d_3 = 1.70$ | $N_2 = 1.74411$ |
| | $r_4 = 16.520$ | $d_4 = 0.51$ | |
| $L_3$ | $r_5 = -4.726$ | $d_5 = 2.00$ | $N_3 = 1.74411$ |
| | $r_6 = -5.197$ | $d_6 = 0.10$ | |
| $L_4$ | $r_7$ 32 4.352 | $d_7 = 1.10$ | $N_4 = 1.74411$ |
| | $r_8 = 24.402$ | | |
| | $F = 4.5$ | N.A. $= 0.5$ | |
| | $Wt = 1.40$ | $t = 1.20$ | $Nt = 1.49$ |
| | $F_{1,2} = 6.97$ | | |
| | $F_1/F_2 = 14.80/12.88 = 1.15$ | | |
| | $F_{1,2}/F_{1,2,3} = 6.97/7.82 = 0.89$, | | | where $r_i$ is the radius of curvature of the i-th lens surface, N.A. is the numerical aperture, Wt is the air gap distance or operating distance between said fourth lens component and said cover glass, t is the thickness of said cover glass, Nt is the refractive index of said cover glass, all of said refractive indices being determined with respect to a ray of light having a wave length of 780 mm.

3. An objective system for a video disc, said objective system including a plurality of lenses each having lens surface with at least some of said lens surfaces being separated by air gaps, said objective system including, in order from the object side, a first lens component including a positive meniscus lens $L_1$, a second lens component including a positive meniscus lens $L_2$, a third lens component including a positive meniscus lens $L_3$ having a long focal length, a fourth lens component including a positive meniscus lens $L_4$, and a cover glass for said video disc, said objective system satisfying the following conditions:

(1) $1.7F > F_{1,2} > 1.4F$
   (2) $1.35 > F_1/F_2 > 0.75$
   (3) $1.0 > F_{1,2}/F_{1,2,3} > 0.8$
   (4) $1.1F > d_5 > 0.4F$
   (5) $d_6 < 0.5F$
   (6) $N_4 > 1.7$, where F is the composite focal length of the objective system, $F_1$ is the focal length of said first lens component, $F_2$ is the focal length of said second lens component, $F_{1,2}$ is the composite focal length of said first and second lens components, $F_{1,2,3}$ is the composite focal length of said first, second, and third lens components, $d_i$ is the distance from the i-th lens surface to the (i+1)-th lens surface in order from said object side, and $N_i$ is the refractive index of the i-th lens numbered from said object side.

4. An objective system for a video disc as claimed in claim 3, said objective system being further defined by:

| | | | |
|---|---|---|---|
| $L_1$ | $r_1 = 11.188$ | $d_1 = 0.92$ | $N_1 = 1.74411$ |
| | $r_2 = 206.715$ | $d_2 = 0.10$ | |
| $L_2$ | $r_3 = 7.056$ | $d_3 = 1.03$ | $N_2 = 1.74411$ |
| | $r_4 = 20.253$ | $d_4 = 0.48$ | |
| $L_3$ | $r_5 = -6.667$ | $d_5 = 3.46$ | $N_3 = 1.48260$ |
| | $r_6 = -6.515$ | $d_6 = 0.10$ | |
| $L_4$ | $r_7 = 4.161$ | $d_7 = 0.91$ | $N_4 = 1.86890$ |

-continued $r_8 = 16.000$
$F = 4.5$     N.A. $= 0.5$
$W_t = 1.40$     $t = 1.20$     $N_t = 1.49$
$F_{1,2} = 7.55$
$F_1/F_2 = 15.86/14.08 = 1.12$
$F_{1,2}/F_{1,2,3} = 7.55/8.27 = 0.91$, where $r_i$ is the radius of curvature of the i-th lens surface, N.A. is the numerical aperture, $W_t$ is the air gap distance or operating distance between said fourth lens component and said cover glass, t is the thickness of said cover glass, $N_t$ is the refractive index of said cover glass, all of said refractive indices being determined with respect to a ray of light having a wave length of 780 mm.

* * * * *